Feb. 1, 1955 A. E. BENNETT 2,701,354
AIRBORNE RADIOSONDE RECORDER
Filed Dec. 16, 1946 2 Sheets-Sheet 1
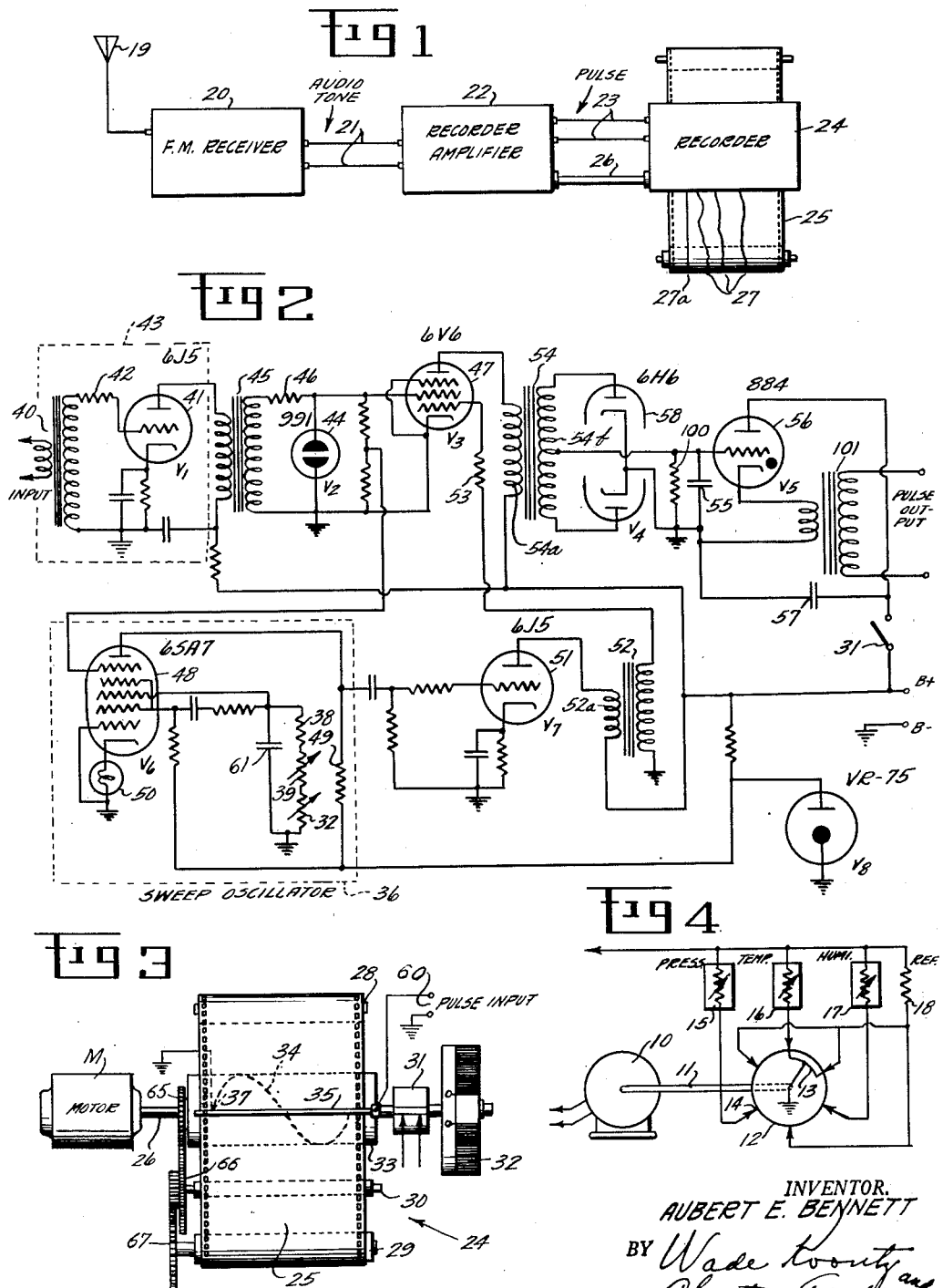
INVENTOR.
AUBERT E. BENNETT
BY Wade Kountz and Chester Tietig
HIS ATTORNEYS

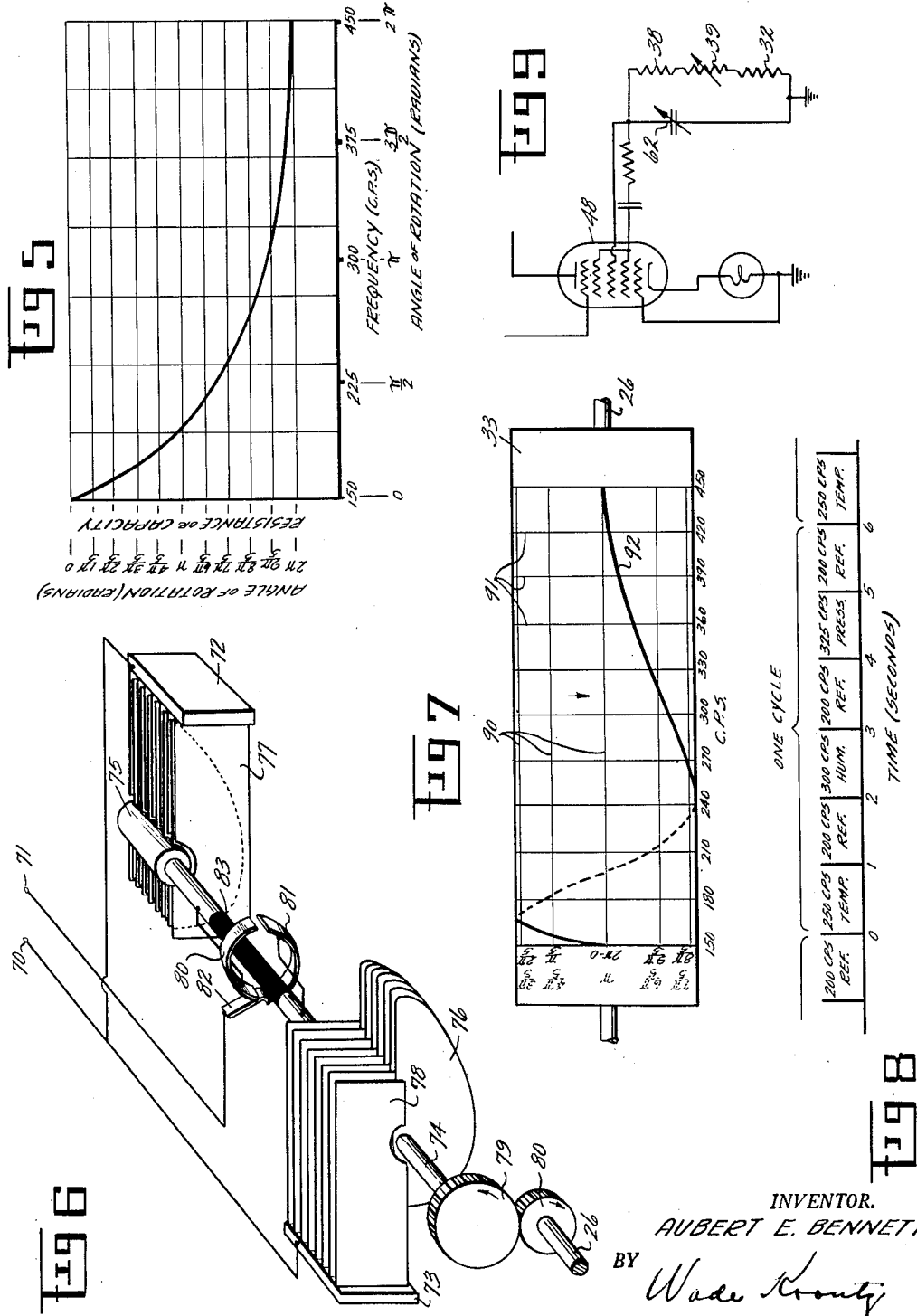

United States Patent Office 2,701,354
Patented Feb. 1, 1955

2,701,354

AIRBORNE RADIOSONDE RECORDER

Aubert E. Bennett, Los Angeles, Calif.

Application December 16, 1946, Serial No. 716,591

11 Claims. (Cl. 340—207)

(Granted under Title 35, U. S. Code (1952), sec. 266)

The invention described herein may be manufactured and used by or for the Government for governmental purposes without payment to me of any royalty thereon.

This invention relates to a radiosonde recorder which may be carried in an airplane. It is intended particularly for military use where information as to weather conditions over enemy territory are desired. When using this recorder, it is intended that a high speed airplane travelling at high altitude shall release a small radio transmitter attached to a free balloon or parachute over the enemy's territory. The airplane will then proceed at high speed away from the point of release and gather the transmitted information on its recorder during flight.

One object of the invention is to provide a recorder sufficiently light and compact to be mounted in an airplane.

Another object is to provide a recorder of the above kind in which the frequency of an audio element in an oscillator is varied in response to the indications of a plurality of weather indicating elements on the transmitter.

Another object is to provide a recorder capable of recording at least three weather conditions, i. e., temperature, pressure and humidity, simultaneously although less than three may be recorded without departing from the spirit of the invention.

Another object is to provide a recorder having a standard of reference so that weather deviations from the standard can be easily gauged.

Another object is to provide a record that is permanent and is made without the use of inks. The latter are objectionable to use in an airplane.

Briefly stated, the basis of the new recorder is the combination of a variable local audio-frequency oscillator beating against an incoming audio-modulated signal to produce a recorder tracing of the frequency of the incoming signal when the signals are at zero beat. Among the unique features are the synchronization of a rotating variable resistor with the recording system.

Referring now to the drawings:

Fig. 1 is a block diagram of the receiving system showing the relation of a frequency modulated receiver to a recorder-amplifier and the relation of the latter to the recorder itself;

Fig. 2 is a schematic electronic diagram of the recorder-amplifier including a sweep oscillator which constitutes the local variable audio frequency source for comparison with the signal frequency;

Fig. 3 is a diagrammatic elevational view of the recorder, its driving means and parts of the sweep oscillator, all mounted on a single drive shaft; and Fig. 4 shows the commutator of the radio transmitter and the organization for generating the signal to which the recorder is responsive.

Fig. 5 shows the relationship between frequency and values of frequency controlling resistance or capacity for oscillator 36.

Fig. 6 shows a variable capacity arrangement for imparting a linear frequency control characteristic to oscillator 36.

Fig. 7 shows the form which the helix on cylinder 33 must take in order to obtain a linear frequency scale on the record when linear frequency control elements are used in oscillator 36.

Fig. 8 illustrates the type of signal encountered in systems to which the invention relates.

Fig. 9 illustrates the use of a variable condenser rather than a variable resistor to control the frequency of oscillator 36.

In Fig. 4, 10 is an electric motor, preferably operating on D. C. of 6 volts and rotating at ⅙ R. P. S. It drives, by means of a shaft 11 (shown as a dashed line), a cylindrical commutator 12. Commutator 12 is made of insulating material with the exception of a metal inlay 13 which is grounded to the shaft 11. Mounted to touch the periphery of commutator 12 and inlay 13 are six brushes 14 of which there are three responsive to weather condition indicators 15, 16 and 17. Each weather indicator controls only its own brush 14. The indicators generally to be used are 15, which is pressure responsive, 16 which is temparature responsive and 17 which is humidity responsive. Besides these, there is a reference indicator 18 which may be a fixed resistor, the others being variable resistances. All are connected into the oscillator circuit of the transmitter in the manner shown. If six brushes are used, they will each be 60° apart. A reference brush divides each indicator brush from its neighbor and so will generate a reference line on the record which is denser than the other lines.

The kind of transmitter preferred is one of about 25 watts, frequency modulated. Each weather indicator 15, 16 and 17 should be capable of changing the audio frequency of the oscillator from 200 to 400 cycles for a maximum to minimum change in the weather conditions. The reference signal remains constant.

Referring now to Fig. 1, the signal from the radiosonde, part of which is shown in Fig. 4, is received on an antenna 19 which is coupled to an FM receiver 20. The latter is responsive preferably to about 70–75 mc. The audio output tone (indicated by arrows) is transmitted by conductors 21 to a recorder-amplifier 22. The output of the latter is transmitted by conductors 23 as a pulse to the recorder 24 itself, through which passes a strip 25 of Teledeltos or other electrically sensitive marking paper. A shaft 26 connecting the recorder amplifier 22 and the recorder 24 furnishes driving power for the latter. On the Teledeltos paper as it leaves the recorder 24 are to be seen three irregular lines 27 denoting weather conditions and the straight reference line 27a. A package roll 28 for the paper, a take up roll 29 and a drive roll 30 (Fig. 3) are provided.

As shown in Fig. 3, an electric motor M, preferably of 28 volts D. C. and 1 R. P. S. drives the recorder 24, a commutating switch 31 therefor and a sweep oscillator potentiometer-resistor 32 by means of shaft 26. The recorder 24 comprises an insulation cylinder 33 upon which there is wound a helix 34 of conductive wire which is grounded. A brush 35 is positioned above the paper strip 25 and the cylinder 33 and connected to one of the terminals 60. The electrically sensitive paper 25 is positioned above cylinder 33 and between helix 34 and brush 35, both of which it contacts, by means of rollers 28 and 29, the latter being coupled to shaft 26 through gears 65, 66 and 67 for moving the paper over the cylinder at a considerably slower rate than the surface speed of the cylinder. When an electrical pulse is applied to terminals 60 a mark appears on the paper directly above that point on the helix which is directly under the brush at that particular instant.

If linearity of the record is desired, the helix 34 must be made in such a way that the transverse motion is accurately proportional to the amount of rotation and potentiometer-resistor 32 must be designed so that the frequency change of the sweep oscillator 36, Fig. 2, is accurately proportional to the transverse motion of the helix. Linearity requires that potentiometer-resistor 32 have a logarithmic taper. The necessity for this may be seen by considering the operation of oscillator 36 of which resistor 32 forms a part. The frequency of this oscillator may be varied by varying the resistor 32, however the variation in frequency will not be linearly related to the variation in resistance. The non-linear relationship existing between frequency and resistance may be easily determined experimentally as follows: set resistor 32 to the value giving the lowest frequency in the band of frequencies to be generated by oscillator 36, say 150 C. P. S. and note the value of resistor 32. Next decrease 32 until the frequency is raised by a given increment, say 10 C. P. S., and again note the value of resistor 32. Continue to raise the frequency by equal increments until the maximum frequency in the band, say 450 C. P. S., is reached, noting the value of resistor 32 at each step. Form a coordinal area having frequency along one axis and resistance along the other and plot points thereon having the above obtained values of frequency and resistance as coordinates. A smooth curve drawn through these points then gives the relationship between frequency and resistance for the particular oscillator. The general shape of such a curve is as shown in Fig. 5. It will be noted that a considerably greater change in resistance is required to produce a given change in frequency at the low end of the frequency band than is required to produce an equal change in frequency at the high end of the band. If angles of rotation are laid off linearly along the frequency axis of Fig. 5 the curve then shows how the resistance of potentiometer 32 must vary with its angle of rotation in order to have the frequency of oscillator 36 vary linearly with the angle of rotation of potentiometer 32 and cylinder 33 which rotates therewith. The construction of potentiometers having non-linear tapers of the above described type is well known in the art. If the oscillator 36 is equipped with a potentiometer 32 designed as above and if the helix or cylinder 33 is uniform, or of constant pitch, as shown in Fig. 3, then the frequency scale on the chart 25 will be linear since the frequency of oscillator 36 and the movement of a point on the paper directly between the helix 34 and brush 35 are both linearly related to the rotation of cylinder 33.

The frequency of oscillator 36 may also be varied by use of a variable capacity 62 rather than a variable resistance as shown in Fig. 9. The relationship between capacity and frequency is of the same form as between resistance and frequency and is also shown by Fig. 5. This relationship may be determined experimentally in the manner described above for resistance. By properly shaping the plates of a variable condenser, as shown in Fig. 6, the capacity may be made to vary with the angle of rotation of the cylinder 33 in accordance with the relationship shown in Fig. 5. When condenser 62 has this characteristic the frequency of oscillator 36 will vary linearly with the rotation of cylinder 33 and, with a uniform helix 34 the frequency scale on chart 25 will be linear.

Figure 6 shows a suitable arrangement of variable condensers for controlling the oscillator 36. The arrangement shown is to replace condenser 62 of Fig. 9 with terminals 70 and 71 being connected where the terminals of condenser 62 were formerly connected. The arrangement consists of two identical condensers 72 and 73 having rotors 75 and 76, respectively, mounted on a common shaft 74. The stator plates 77 and 78 are positioned as shown so that in the first half revolution of shaft 74 the capacity of condenser 72 decreases from maximum to minimum and during the second half revolution of shaft 74 the capacity of condenser 73 decreases from maximum to minimum. By means of a commutator, one segment 80 of which is connected to the rotor 75 and the other segment 81 of which is connected to rotor 76, and a cooperating brush 82, the condenser 72 is connected between points 70–71 for the first half revolution of shaft 74 and the condenser 73 is connected between points 70–71 for the second half revolution of shaft 74. The rotors 75 and 76 are isolated electrically by an insulation section 83 in shaft 74. The shaft 74 is coupled to shaft 26 of cylinder 33 through 2:1 reduction gears 79–80 so that shaft 74 makes one half revolution for each revolution of shaft 26. Therefore the first revolution of cylinder 33 and shaft 26 causes condenser 72 to change from its maximum to its minimum capacity in accordance with the curve in Fig. 5 and as a result the frequency of oscillator 36 varies linearly from its minimum to its maximum value or from 150 to 450 C. P. S. At the beginning of the second revolution of shaft 26 brush 82 leaves segment 80 and makes contact with segment 81 thus disconnecting condenser 72 and connecting condenser 73, which is now at maximum capacity, into the circuit. This condenser then varies from its maximum to its minimum capacity causing a linear variation of frequency from minimum to maximum as did condenser 72. At the beginning of the third revolution of shaft 26 condenser 72 is again connected to the circuit and the cycle repeated.

It is not necessary to use a non-linear potentiometer or capacity element as described above in order to obtain linearity of the frequency scale on the record. This may also be accomplished by using a linear potentiometer or capacity element, or one in which the resistance or capacity is proportional to the amount of rotation of the element, and providing the cylinder 33 with a helix the transverse motion of which is non-linearly related to the amount of rotation of the cylinder. The exact form required for the helix may be determined from Fig. 5 as follows: Divide that part of the vertical or resistance-capacity axis between the highest and lowest values of resistance or capacity into a number of equal divisions with zero angle of rotation of cylinder 33 corresponding to the highest value of resistance or capacity and $2\pi$ radians of rotation corresponding to the lowest value of resistance or capacity, as shown. Divide that part of the surface of cylinder 33 located below the record portion of paper 25 into an equal number of divisions, having the same angular spacing as the above mentioned divisions in Fig. 5, by drawing a series of lines on its surface parallel to the longitudinal axis. These lines are shown at 90 in Fig. 7, which is a plan view of cylinder 33 with the arrow indicating the direction of motion of the upper surface as the cylinder rotates. Next divide one of the lines 90 into a number of equal divisions and through each point of division draw a line around the cylinder perpendicular to the lines 90. These lines are designated 91 in Fig. 7 and represent equal increments of frequency with the lowest frequency on the left as shown. Thus the lines 90 and 91 form a rectangular system of coordinates on the surface of the cylinder 33 with angles of rotation along one axis and frequency along the other. Using various angles of rotation of cylinder 33, taken along the vertical axis of Fig. 5, and the corresponding frequencies, as determined from the graph in Fig. 5, as coordinates, a series of points may be located on the surface of cylinder 33. The smooth curve 92 drawn through these points gives the proper form of the helix required for a linear frequency scale on the record when using a linear potentiometer 32 or capacitor 61 in oscillator 36.

If absolute linearity is not required, a logarithmic potentiometer with reasonable accuracy may be used and a calibrated scale furnished with each recorder. The helix 34 is preferably rotated slowly to improve the accuracy. Increasing the audio frequency octave transmitted by the radiosonde, i. e., from 200–400 cycles to 400–800 cycles will double the recording accuracy. The reference signal frequency remains constant at either 200 or 400 cycles.

The oscillator 36 is of the resistance-capacity type in which the screen grids of a five grid tube 48 are coupled as anodes of a feed back circuit. Its frequency is regulated by variable resistor 32, the operation of which has already been explained, and variable resistor 39 which is for the purpose of centering the graph on the record. The frequency may also be controlled by varying capacity 61 as has also been explained.

The recorder amplifier 22, the schematic diagram of which is shown in Fig. 2, functions as a frequency comparison device which provides a pulse output each time the input frequency and the frequency of the sweep oscillator 36 are equal. The output audio frequencies from the FM receiver 20 are applied to the primary of a 500 ohm line to a grid transformer 40. The secondary voltage of transformer 40 is applied to the grid of a triode 41 through a grid current limiting resistor 42. The triode 41 functions as a limiting amplifier to guarantee that sufficient signal is applied to the network made up of resistor 46 and gas tube 44 at all times. The output of stage 43 is applied across the neon or other gas tube 44, through a plate-to-grid transformer 45, and a current limiting resistor 46. The gas tube 44 functions as a peak limiter and should be mounted on the front panel of the amplifier and be used as a volume indicator. The gain control of the receiver should be advanced sufficiently to cause gas tube 44 to glow brilliantly at all times during the recording. The limited output of stage 43 is applied to the screen grid of a pentode 47 and a small portion is applied to the suppressor grid of a heptode tube 48. Tube 48 functions as a resistance-capacity oscillator, the frequency of which is varied from below the minimum to above the maximum frequency range of the weather indicating elements 15—16—17 in the transmitting equipment. This frequency variation is accomplished by connecting the rotating arm (not shown) of resistor or potentiometer 32 to the rotating shaft 26 of the cylinder 33 in the electric recorder 24. The potentiometer-resistor 32 is so connected to the shaft 26 that the change from maximum to minimum frequency at the end of one sweep coincides with the maximum to minimum change of the helix sweep. A potentiometer 39 is mounted on the front panel of the amplifier and is used to center the recorded lines on the Teledeltos paper. This control will change the frequency of the oscillator which in effect, moves all the recorded lines on the Teledeltos paper to the right or left equally. A resistor 49 in series with the plate circuit of tube 48 is of such a value as to place a 230 volt 10 watt lamp 50 which is in series with the filament of tube 48, in the center of its negative resistance curve. The audio frequency output of the sweep oscillator 36 is capacity coupled to the grid circuit of a triode limiting-amplifier 51. The output of amplifier 51 is applied to the control grid of pentode mixing tube 47 through a plate to grid transformer 52 and a current limiting resistor 53. The primary 52a of transformer 52 is in series with the plate circuit of the tube 51. The transformer 52 is phased in such a way that when the input frequency from the FM receiver 20 and the frequency of the sweep oscillator 36 are of the same value, and the sweep oscillator 36 is locked by the "synchronizing voltage" from the input frequency, then the voltage applied to the screen grid and control grid of pentode mixing tube 47 will be 180 degrees out of phase with each other or opposite in polarity. This action prevents pentode 47 from passing any A. C. plate current through a class B grid transformer 54, the primary 54a of which is in series with the plate circuit of tube 47. Such blocking occurs when the input frequency and the sweep frequency are equal. At all other times, mixer tube 47 is passing an audio frequency of some random value through the plate to class B grid transformer 54. This random audio frequency is full wave rectified by a vacuum tube full wave rectifier 58 in series with the secondary 54b of transformer 54 and applied negatively to the grid of a thyratron 56. A condenser 55 between grid and ground of thyratron 56 should be only large enough to maintain a high steady negative voltage on the grid and not large enough to prevent the voltage from dropping to zero each time the input and sweep frequencies are equal. Another condenser 57 which is connected between the plate and ground of thyratron 56 is charged through switch 31 once for each revolution of the helix. Switch 31 is a commutator switch on the helix shaft and is mechanically arranged to charge the condenser each time the helix sweep changes from maximum to minimum. It is therefore evident that only one discharge of the thyratron 56 is able to take place for each revolution of the helix. The length of time during which the voltage at the grid of thyratron 56 equals zero is determined by the capacitative value of condenser 55, the speed of the rotating helix, and the amount of synchronizing or locking voltage applied to the suppressor grid of mixing tube 48. However, the time duration of the zero voltage on the grid of thyratron 56 will not affect the accuracy of the record since this tube will conduct only once and this single pulse occurs as soon as the grid voltage has decreased to a value equol to the cut-off potential of thyratron 56. Therefore, if the charge on condenser 55 and the synchronizing voltage control remain unchanged, the discharge will occur at precisely the same time for any particular frequency regardless of how long this grid voltage remains at zero. The accuracy of the finished record depends only upon the mechanical design of the electric recorder and the resistive-capacitive elements in the oscillating circuit of the heptode tube 48. These elements may change in such a manner as to change all frequencies equally and in the same direction but must not increase or decrease the overall frequency range at which the instrument was calibrated.

This entire radiosonde recorder including a 70 to 75 megacycle receiver can be constructed in one carrying case to weigh not more than 60 lbs. It may, therefore, be used in localities where present weather recording equipment cannot be transported.

The overall operation of the system is as follows: The transmitter radiates a carrier frequency which is modulated successively by audio frequencies representing three weather characteristics and a reference frequency. The character of this modulation for one cycle of operation of the transmitter is shown in Fig. 8. In a practical application the cycle may be about six seconds in length allowing each frequency to be transmitted for one second at a time. The cycle repeats continuously with the frequencies representing temperature, humidity and pressure changing as these conditions change but with the reference frequency always remaining constant. The modulated carrier is received and detected in the receiver and the resulting modulation, which is as shown in Fig. 8, is applied to the circuit of Fig. 2.

Assume that the received signals may be anywhere between 200 and 400 C. P. S. and that at a particular instant a frequency of 300 C. P. S., representing the humidity at that instant, is applied to the input of transformer 40. This signal is applied to the screen grid of tube 47 through amplifier 43 and associated circuits including gas tube 44 which insure that the amplitude of the signal on the screen grid will remain constant through a wide variation of input signal strength. A portion of the 300 C. P. S. signal on the screen grid is also applied to the outermost grid of tube 48. This tube acts as an audio oscillator whose frequency is controlled by variable resistor 32. The output of audio oscillator 36 is applied through amplifier 51 and transformer 52 to the control grid of tube 47. If the frequency of oscillator 36 is other than 300 C. P. S. the frequencies on the control and screen grids of tube 47 differ and therefore have no fixed phase relation with each other. Under this condition no cancellation of the tube output can take place and a resultant output voltage appears across the secondary of transformer 54 which, after rectification by tube 58, develops a negative direct voltage across condenser 55 which biases tube 56 to a nonconductive condition. However, if the frequency of oscillator 36 is brought very near to 300 C. P. S. by variation of resistor 32, the oscillator will lock into step with the 300 cycle frequency applied to its outermost grid and its output frequency will be exactly 300 C. P. S. When this occurs the frequencies on the grid and control grid of tube 47 will be equal and, due to the poling of transformer 52, 180 degrees out of phase. Under this condition the effects of the two frequencies cancel each other and the output of tube 47 and the voltage across the secondary of transformer 54 fall to zero. When this occurs the condenser 55 discharges rapidly through resistance 100 removing the disabling bias from tube 56 and allowing condenser 57 to discharge through this tube and the primary winding of transformer 101. The discharge current through the primary of transformer 101 induces a pulse of voltage in its secondary winding which is applied to terminals 60, Fig. 3, and thence between brush 35 and helix 34. Further variation of resistor 32 varies the natural frequency of the oscillator sufficiently to cause it to break out of synchronism with the 300 C. P. S. signal on its outermost grid so that the frequencies of the signals or the screen and control grids of tube 47 to again have different values. This condition restores the output voltage of tube 47 and as a result the bias voltage across condenser 55.

As already explained, variable resistance 32 is mounted on shaft 26 and serves to vary the frequency of oscillator 36 as cylinder 33 rotates. Also, as already explained, the resistance 32 varies non-linearly with the rotation of cylinder 33 in order to cause the frequency of oscillator 36 to vary linearly with the rotation of cylinder 33. Assume cylinder 33 to be at the starting point of one revolution, or in other words, with the beginning of helix 34 directly beneath brush 35 at the left of chart 25. In this position resistance 32 has its highest value and oscillator 36 its lowest frequency which, following the example of Fig. 5, would be 150 C. P. S. As cylinder 33 revolves, resistance 32 decreases and the frequency of oscillator 36 increases. After one-half revolution, or $\pi$ radians, the resistance has been reduced sufficiently to bring the oscillator frequency to 300 C. P. S., as shown in Fig. 5. At this point, when the frequency of the oscillator is equal to the incoming frequency a pulse is produced in transformer 101, in the manner described above, which is applied between brush 35 and helix 36 to mark the record 25. This mark will appear in the center of the record, midway between 200 and 400 C. P. S., since the helix 34, due to its constant pitch, will have progressed one-half the distance across the paper in one-half revolution of cylinder 33 and will therefore be under the brush at the center of the paper chart 25. The function of switch 31 is to charge condenser 57 at the beginning of each revolution so as to have a source of energy available for marking the record when the oscillator frequency becomes equal to the received frequency. Since condenser 57 is charged only once for each revolution of cylinder 33 it follows that only one mark is placed on the record for each revolution of the cylinder. Thus, briefly, during one revolution of cylinder 33 the oscillator sweeps linearly over the band of received frequencies and the point on helix 34 beneath brush 35 moves linearly to the right. At some instant in each revolution the oscillator frequency becomes equal to the received frequency and, at that instant, a mark is made on the record which indicates by its position the value of the received frequency at that time.

If, instead of using variable resistor 32, the capacity 62, Fig. 9, is used to control the frequency of oscillator 31 and if the capacity 62 is given the proper degree of non-linearity to produce a linear oscillator output as previously explained, then the operation of the device is exactly the same as described above. However, if variable resistance 32, or capacity 62, is a linear device, then, as previously explained, the frequency of oscillator 36 will not vary linearly with the rotation of cylinder 33 but will vary in the manner shown by Fig. 5, taking the angle of rotation along the vertical or resistance-capacity axis. In order to obtain a linear frequency scale on the chart under this condition it is necessary, as previously explained, to employ a non-uniform helix such as shown in Fig. 7. It is seen from Fig. 5 that the cylinder 33 must rotate through about $$\frac{8.75}{5}\pi \text{ radians}$$

in order to raise the frequency of oscillator 36 from 150 to 300 C. P. S. Referring to Fig. 7 it is seen that after cylinder 33 has rotated through $$\frac{8.75}{5}\pi \text{ radians}$$

the helix 92 has travelled to the right to the center or the 300 C. P. S. line. In other words, the relationship between the transverse motion of the helix with respect to the angle of rotation of the cylinder is the same as the relationship between the frequency of oscillator 36 and the angle of rotation of the cylinder, which results in a linear frequency scale on the chart 25.

The various points on the temperature and pressure curve and on the reference frequency curve are recorded in the same manner as the recording of one point on the humidity curve described above. The various curves on the record may be identified from observed values of temperature, humidity and pressure at the beginning of the record. In order to insure that all received signals are recorded the period of rotation of cylinder 33 should not exceed the length of time for which each signal is transmitted. In the case of the specific example shown in Fig. 8 this would be one second.

The invention claimed is:

1. In a radiosonde system in which atmospheric data are represented by the audio frequency modulation on a transmitted carrier wave, a recorder comprising a receiver for receiving and demodulating said carrier wave to produce the original audio frequencies, a local audio oscillator, a cylinder of insulating material having a helical ridge of conductive material mounted on its surface, said helical ridge making one complete turn on the cylinder, a narrow brush of conductive material equal in length at least to the axial distance travelled by said helical ridge in one revolution of the cylinder and positioned parallel to the axis of the cylinder and in proximity to said helical ridge, means for rotating said cylinder at a constant speed, means for positioning and moving a strip of electrically sensitive record paper between said helical ridge and said brush at a speed considerably less than the surface speed of said cylinder, means fixedly related to said cylinder rotating means for varying the frequency of said local oscillator from a frequency below the lowest received audio frequency to a frequency above the highest received audio frequency for each revolution of the cylinder, a mixer tube, means for applying the audio frequency output of said receiver and the audio frequency output of said local oscillator to said mixer tube in such relative phase that when the two audio frequencies are equal their effects are opposed and the output of the mixer is reduced to a minimum, means coupled to the output circuit of said mixer tube and responsive to a reduction of the mixer output to a minimum for producing a voltage pulse, and means for applying said pulse between said brush and said helical ridge.

2. Apparatus as claimed in claim 1 in which said voltage pulse producing means comprises a rectifier for converting the output of said mixer into a direct voltage, a thyratron tube, means for applying said direct voltage between the grid and cathode of said thyratron tube so as to bias the grid negative with respect to said cathode, a condenser connected in the anode circuit of said thyratron tube, and means comprising means fixedly related to said cylinder rotating means for charging said condenser at the beginning of each revolution of said cylinder.

3. Apparatus as claimed in claim 1 in which said cylinder rotating means is designed to operate at such speed that said rotating cylinder makes at least one revolution for each signal received by the recorder from the transmitting element of the radiosonde system.

4. Apparatus as claimed in claim 1 in which means are provided for applying audio frequency voltage from the output of said receiver to said local oscillator in order to cause the frequency of the oscillator to lock in with that of the receiver output when the two frequencies approach the same value.

5. Apparatus as claimed in claim 1 in which the means for varying the frequency of the local oscillator is a variable resistor having a non-linear taper of the required form to cause the frequency of said oscillator to be linearly related to the angular motion of said cylinder and in which the transverse motion of said helical ridge is linearly related to the angular motion of said cylinder.

6. Apparatus as claimed in claim 1 in which the means for varying the frequency of the local oscillator is a variable resistor having a linear taper and in which the transverse motion of said helical ridge has the same non-linear relationship to the angular motion of said cylinder as does the frequency of said oscillator.

7. Apparatus as claimed in claim 1 in which the means for varying the frequency of the local oscillator is a variable condenser having a linear characteristic and in which the transverse motion of the helical ridge has the same non-linear relationship to the angular motion of said cylinder as does the frequency of said oscillator.

8. Apparatus as claimed in claim 1 in which the means for varying the frequency of the local oscillator is a variable condenser having a straight-line-frequency characteristic and in which the transverse motion of the helical ridge is linearly related to the angular motion of said cylinder.

9. Apparatus as claimed in claim 1 in which a limiter is provided to maintain the output of said receiver at a constant level.

10. In a radiosonde system of the type in which atmospheric data are represented by audio frequencies, a recorder for said audio frequencies, said recorder comprising a local oscillator, means for varying the frequency of said oscillator over a band of frequencies wide enough to include all frequencies to be recorded, a cylinder having a helical ridge of conductive material on its surface making at least one complete turn about said cylinder, means for rotating said cylinder at constant speed, a narrow brush of conductive material having a length equal at least to the axial distance moved by said helical ridge in one revolution of said cylinder and positioned parallel to the surface of said cylinder and in proximity to said helical ridge, means for positioning a strip of electrically sensitive paper between said brush and said helical ridge and for moving said paper at a constant speed considerably less than the surface speed of said cylinder, coupling means between said oscillator frequency varying means and said cylinder rotating means for causing said oscillator to sweep over said frequency band once for each complete revolution of said helical ridge, and means responsive to said oscillator frequency and to the frequency to be recorded for applying an electrical pulse between said brush and said helical ridge at that instant during each revolution of said helical ridge when the oscillator frequency is equal to the frequency to be recorded.

11. Apparatus as claimed in claim 10 in which said last named means comprises a mixing circuit, means for applying the audio frequency to be recorded and the frequency of said oscillator to the input of said mixing circuit in proper amplitude and phase for the output of said mixing circuit to be reduced to zero when said oscillator frequency is equal to the frequency to be recorded, means connected to the output of said mixing circuit and responsive to a reduction of said output to zero to produce an electrical pulse, and means for applying said pulse between said brush and said helical ridge.

References Cited in the file of this patent

UNITED STATES PATENTS 2,086,892    Barton ---------------- July 13, 1937